Aug. 23, 1966  H. J. SNYDER ETAL  3,267,491
FLUSH VALVE ASSEMBLY
Filed April 28, 1964  2 Sheets-Sheet 1
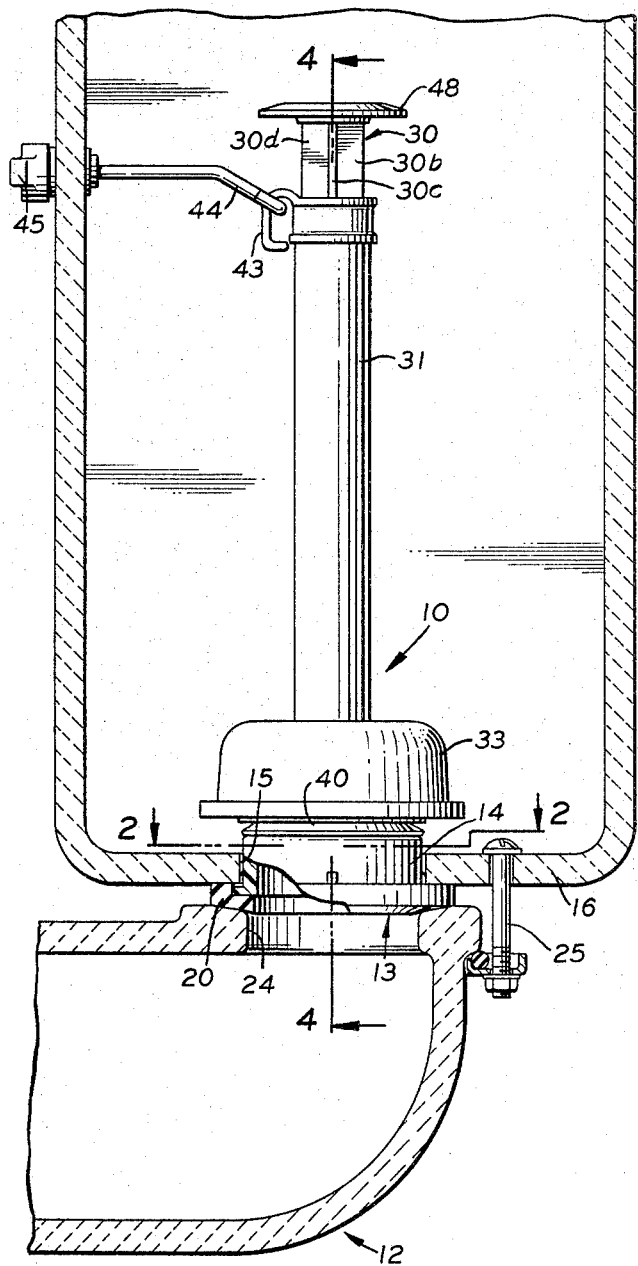
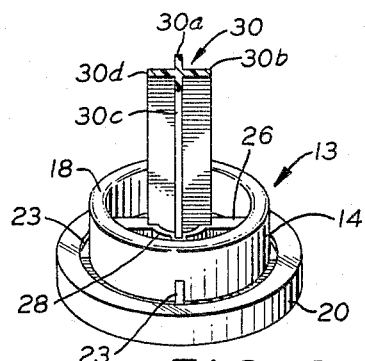
INVENTORS.
HERBERT J. SNYDER
CLAYTON D. OBRECHT
BY HOWARD A. FULTON
Hamilton & Cook
ATTORNEYS.

Aug. 23, 1966  H. J. SNYDER ETAL  3,267,491

FLUSH VALVE ASSEMBLY

Filed April 28, 1964  2 Sheets-Sheet 2

INVENTORS.
HERBERT J. SNYDER
CLAYTON D. OBRECHT
BY HOWARD A. FULTON

Hamilton & Cook

ATTORNEYS.

United States Patent Office 3,267,491
Patented August 23, 1966

3,267,491
FLUSH VALVE ASSEMBLY
Herbert J. Snyder, Loudonville, Clayton D. Obrecht, Ashland, and Howard A. Fulton, Perrysville, Ohio, assignors to Mansfield Sanitary, Inc., Perrysville, Ohio, a corporation of Ohio
Filed Apr. 28, 1964, Ser. No. 363,111
2 Claims. (Cl. 4—58)

The present invention relates generally to a valve for a water closet. More particularly, the present invention relates to a flush valve assembly. Specifically, the present invention relates to a flush valve assembly for close coupled water closet combinations.

A flush valve assembly of the type disclosed in the subject application is utilized with water closet combinations comprising a bowl and a tank. When such a water closet combination is installed, the bowl is first affixed to the floor and the tank is then supported directly on the bowl in such a way that a flow conduit is provided from the tank to the bowl. A seal must be effected between the bowl and the tank to prevent undesirable leakage of water and a valving mechanism must be provided along the flow conduit selectively to control the flow of water from the tank into the bowl for flushing. This valve must be capable of effectively closing the flow from the tank to the bowl; must be easily operated; must remain open only until the water reservoir in the tank has been evacuated during the flushing operation; and, must then quickly and efficiently close.

In order to accomplish all these functions it has heretofore been necessary to utilize a sealing means between the tank and the bowl, a separate sealing means either through or on both sides of the passage through the bottom of the tank, and provide a satisfactory valving element. The prior art is exemplified in one known construction where a flanged nut was secured onto a threaded spud to tighten a sealing gasket around the passage through the tank. A second gasket, unitary with the flanged nut, provided the seal between the tank and bowl when the former was mounted on the latter. A ball, seated against the top of the opening through the spud, formed the valve.

In such constructions additional guides and the like have always been required to be provided for assuring that the ball will seat properly on closing, and these guides often become bindingly engaged with the mechanism by which the ball is lifted off the spud.

Moreover, the prior art flush valve assemblies have long been comprised of multitudinous parts which must be meticulously assembled onto the tank by the plumber in a time consuming fashion before the tank can be mounted on the bowl.

It is therefore an object of the present invention to provide a flush valve assembly which seals the tank to the bowl and the flow conduit therebetween with a single seal means.

It is another object of the present invention to provide a flush valve assembly, as above, which utilizes a spud insertable within, and self-attaching to, the exhaust passage through the tank to carry the aforesaid seal means and also to support the guide for the valving element.

It is a further object of the present invention to provide a flush valve assembly, as above, which comprises fewer parts and which can be assembled quickly and efficiently merely by inserting the spud upwardly from beneath the tank into the hole therethrough and then slidingly positioning the valve element over the guide on the spud.

These and other objects of the invention, as well as the advantages thereof over existing and prior art forms, will be apparent in view of the following detailed description and the attached drawings and are accomplished by means hereinafter described and claimed.

One preferred embodiment is shown by way of example in the accompanying drawings and hereinafter described in detail without attempting to show all the various forms and modifications in which the invention might be embodied; the invention being measured by the appended claims and not by the details of the specification.

In the drawings:

FIG. 1 is a vertical sectional view through a close coupled tank and bowl showing the flush valve assembly of the subject invention in elevation and partly broken away;

FIG. 2 is a cross section taken substantially on line 2—2 of FIG. 1;

FIG. 3 is a perspective view of the spud used in the subject flush valve showing a portion of the guide for the valving element;

Figure 5:
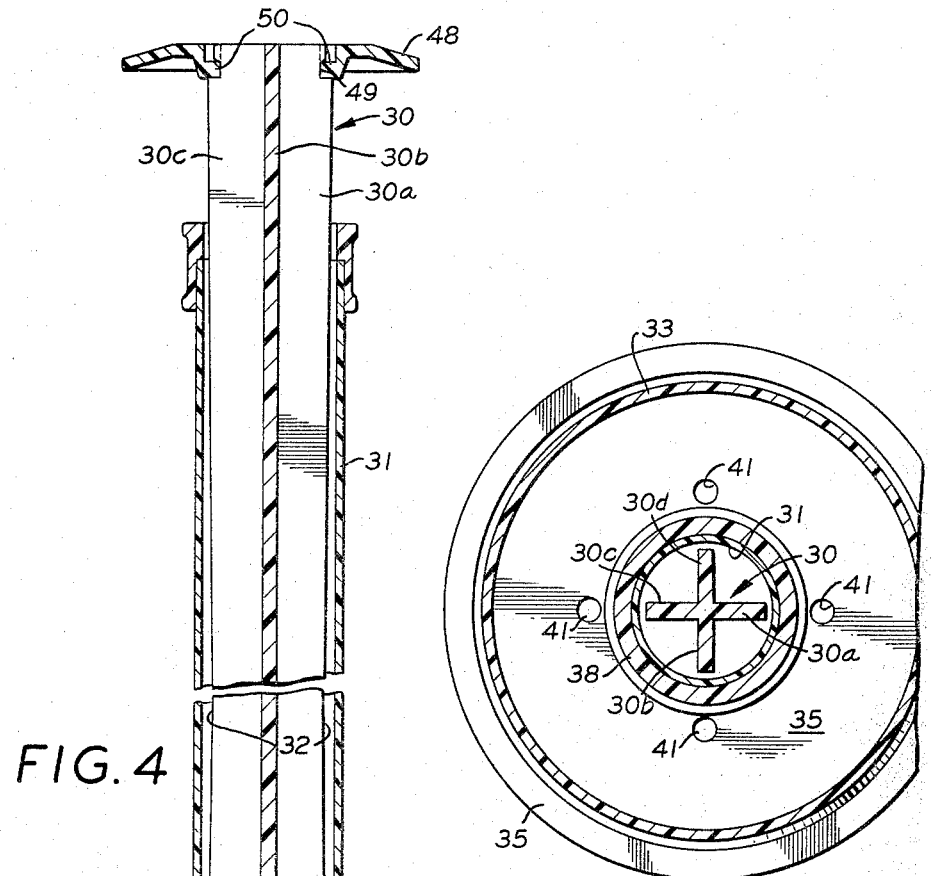

In general, a flush valve assembly constructed according to the concept of the present invention has a flanged spud the body of which is insertable in, and self-attaching to, a hole through the bottom of the tank. The flange carries a sealing means which not only seals the tank to the bowl but also the hole through the tank from the outside. A valve guide extends vertically upwardly from the spud and is encircled by the valve element which selectively engages the spud to control flow out of the tank into the bowl for flushing.

Referring specifically to the drawings, the improved flush valve assembly of the subject invention is designated generally by the numeral 10 and is depicted in combination with the tank 11 and bowl 12 of a close coupled water closet.

The flush valve assembly 10 includes a spud 13 having a body portion 14 insertably received in the discharge opening 15 of the tank 11. The upper end of the body portion 14 extends only slightly upwardly from the base 16 of tank 11, thus permitting an almost complete evacuation of the water reservoir in the tank 11 outwardly through the hollow spud when the closet is flushed. This permits a more compact tank and leaves less residue to be removed should it be necessary to remove the tank for repairs.

Although it is desirable thus to evacuate as much water from the tank as possible during the flushing operation, the axial dimension of the body portion 14 must be sufficient to allow for warpage of the base 16 which might occur during firing and to provide a seat 18 on the upper end against which a valving element can sealingly abut.

Extending radially outwardly from the lower extremity of the body portion 14 is an annular flange 19. A sealing means, or gasket, 20 is carried on flange 19. As shown, the annular gasket has a rabbet 21 into which the flange 19 is frictionally received. The axial depth of rabbet 21 is greater than the thickness of the flange 19 to assure full annular contact of the gasket 20 with the undersurface 22 of the base 16. Similarly, the outer diameter of gasket 20 is greater than the outer diameter of the flange 19 and the axial extent of the rabbet 21 is greater than the axial extent of the flange 19 to assure sufficient material for a seal directly between the tank 11 and the bowl 12.

As best shown in FIG. 3, a plurality of radially extending fins 23 are attached to the body portion 14. These fins 23 are made of a semi-frangible material so that they will partially crush when the spud 13 is inserted into the discharge opening 15 in the tank 11. By being thus crushed, the fins 23 form spurs which frictionally engage the sides of the opening 15 to maintain the spud in the tank 11 while it is being positioned on the bowl 12.

When the tank 11 is positioned with the discharge opening 15 generally aligned with the inlet opening 24 of the bowl 12, securing means, such as the three bolts 25, tighten the tank 11 firmly in position in the customary fashion. The tightening of the tank 11 onto the bowl 12 squeezes the gasket into sealing engagement around the aligned openings 15 and 24.

The interior of the spud 13 together with the inlet opening 24 forms a flow conduit from the tank 11 into the bowl 12. Also interiorly of the spud 13 is a spider 26. The four-legged spider 26 shown in FIG. 2 terminates in a centrally located receiving ring 28 into the inner surface of which are formed an appropriate number of axially aligned receiving grooves 29. The lower end of a multi-vaned guide 30 is frictionally mounted in the receiving ring 28. By the use of four vanes 30a, 30b, 30c and 30d, as shown, the lower ends of which are reduced in span for insertion in ring 28 (FIG. 4), the guide 30 is given considerable stability.

Figure 4:
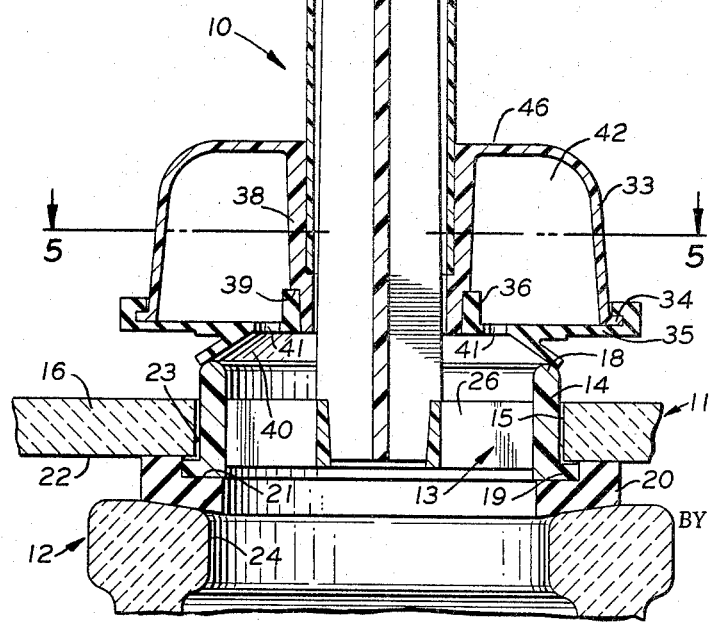
FIG. 4 is an enlarged cross section taken substantially on line 4—4 of FIG. 1; and, FIG. 5 is a partial cross section taken substantially on line 5—5 of FIG. 4.

Moreover, a tubular overflow pipe 31 is slidably received over the guide 30 in an encircling manner and the four vanes provide a nonbinding guiding effect to the axial movement of pipe 31. This nonbinding effect is greatly enhanced by providing a slight inward curvature, or concavity, to the axial extent of the edge 32 of each vane 30, as best shown in FIG. 4.

An outwardly and downwardly extending skirt 33 is fitted to the lower portion of overflow pipe 31 to provide an air retaining float which functions to prevent premature valve closure during the flush operation. Around the outer and lower extremity of the skirt 33 is a radially outwardly extending lip 34. A diaphragm 35 is hooked over lip 34 and extends radially inwardly terminating in a collar 36 which engages the axially oriented, central sleeve 38 on skirt 33. The pipe 31, skirt 33 and diaphragm 35 form the valve element.

The sleeve 38 embraces the lower end of pipe 31 to retain the skirt 33 thereon and is of sufficient axial extent that it forms a lower portion, or continuation of the pipe 31 so that the diaphragm 35 will lie substantially horizontally.

The upper end of collar 36 engages a downwardly directed stop shoulder 39 on sleeve 38 which permits the collar 36 from moving upwardly along sleeve 38. This is necessary because of the downward force of the water on the skirt 33 when the tank 11 is full and the upward force of the diaphragm 35 reacting therefrom when the valve lip 40 engages the seat 18 on spud 13.

The annular valve lip 40 is attached to and extends flaringly downwardly and outwardly from the medial portion of diaphragm 35. Another reason why it is desirable for the seat 18 to extend upwardly from the base 16 of tank 11 is so that the valve 40 can assuredly engage the annular seat 18 without obstruction from the base 16 of tank 11.

Radially inwardly of the valve lip 40 and outwardly of collar 36 are provided one or more drainage vents 41. These vents 41 prevent any water from remaining in the cavity 42 defined inwardly of the skirt 33 and upwardly of the diaphragm 35, and thus assure the necessary buoyancy of the valve during the flushing operation. As best shown in FIG. 4, the vents 41 drain directly into the interior of the spud 13 and the inlet opening 24 in bowl 12.

At the top of the pipe 31 is a connector ring 43 which is engaged by the standard flush valve lever 44 so that actuation of the handle 45 will raise the valve lip 40 off the seat 18 to initiate the flush.

To those skilled in the art it will now be apparent that the reservoir of water in the tank 11 will act downwardly on the skirt 33 to maintain the valve lip 40 in sealing contact with seat 18.

When the handle 45 is actuated to raise the valve element and disengage the lip 40 from the seat 18, the water will rush into the passageway through spud 13, and the lift of the water against the underside of the diaphragm 35 will maintain the lip 40 off of the seat.

As the last of the water is drained out of tank 11 during the final stages of the flush, the buoyancy of the valve element provided by cavity 42 retards the downward movement of the valve element to a rate slower than the lowering of the water level to permit almost complete evacuation of the water in tank 11 before the valve lip 40 lowers against the seat 18 on spud 13. Thereafter, as the water refills the tank 11, the weight of the pipe 31, skirt 33 and diaphragm 35, which is carefully designed slightly to exceed the buoyant effect of the volume of water displaced by the skirt 33 and diaphragm 35, maintains the valve lip 40 sealed against the seat 18 until the water level raises above the level of the top 46 of skirt 33. Once the water reaches that level the downward force, or head, of the water in tank 11 retains the valve closed. A certain amount of the water may trickle through the vents 41 and into the cavity 42 during the flushing action, but the air trapped beneath the skirt 33 will maintain the buoyancy necessary to retard the return of the lip 40 into engagement with the seat 18.

The extent of the upward movement of pipe 31 is limited by a stop cap 48 demountably attached to the top of the vaned guide 30. To facilitate the installation of the subject assembly, the stop ring 48 is preferably attached to the guide 30 by a fast make coupling arrangement, so that it can be selectively attached and detached by a slightly rotative movement. For example, the upper end of each vane 30a, 30b, 30c and 30d may be provided with a radially directed notch 49 which lockingly receives a lug 50 on the stop ring 48 upon slight rotation of the ring 48 and which is as easily disengaged therefrom.

To install the subject assembly, the stop cap 48 and the valve element (the pipe 31, skirt 33 and diaphragm 35) are removed and the guide 30 is inserted upwardly through the discharge opening 15 of tank 11 until the spud is partially inserted therein. A sharp blow with the hand at the bottom of the spud 13 drives the spud 13 fully into the opening 15, crushing the radially outer ends of the fins 23 which then tightly engage the opening 15 to maintain the spud and guide in position while the tank 11 is placed on the bowl 12.

The gasket 20 is retained on the flange 19 of spud 13 by frictional engagement therewith and, as the bolts 25, which hold the tank 11 onto the bowl 12, are tightened the gasket 20 is compressed into sealing engagement between the tank 11 and bowl 12.

The valve element is then slidably positioned over the guide 30 and the stop cap 48 replaced. As soon as the valve lever 44 is properly positioned in connector ring 43 the closet is ready for use. It should be noted that provision can and generally is, made in the stop cap for the silent fill tube to be inserted therethrough. Here too the vaned guide is particularly useful since the water emanating from the silent fill tube can flow quietly down the vanes into the inlet 24 for filling the bowl after the flush.

It is thus apparent that a flush valve assembly constructed in accordance with the concept of the present invention provides a nonbinding arrangement of fewer parts with only a single seal means which can be quickly and easily installed and which otherwise accomplishes the objects of the invention.

What is claimed is:

1. A flush valve assembly for a water closet having a tank with a discharge opening close coupled to a bowl, said valve assembly comprising, a spud having an annular body portion and a flange portion, said body portion insertably received in said discharge opening with said flange portion extending radially outwardly of said body portion between said tank and said bowl, a single annular gasket frictionally engaged with said flange portion to seal the tank to the bowl and the annular body portion to the tank, said sealing gasket extending from beneath said flange portion outwardly thereof and having a greater outer diameter than said spud flange portion and a greater axial dimension than said flange portion, a guide attached to and extending axially of said body portion, an overflow pipe slidably encircling said guide, a flexible valve element carried on the lower end of said overflow pipe for selective engagement with said spud body portion.

2. A flush valve assembly, as set forth in claim 1, wherein at least one frangible fin extends radially outwardly of said spud body portion for frictionally engaging said tank from within said discharge opening.

References Cited by the Examiner

UNITED STATES PATENTS

| 2,945,239 | 7/1960 | Fulton et al. | 4—58 |
| 3,107,747 | 10/1963 | Parkison | 4—58 |
| 3,153,247 | 10/1964 | Walsh | 4—58 |
| 3,172,129 | 3/1965 | Fulton et al. | 4—60 |

LAVERNE D. GEIGER, *Primary Examiner.*

H. ARTIS, *Assistant Examiner.*